(12) United States Patent
Chen et al.

(10) Patent No.: US 11,240,564 B2
(45) Date of Patent: Feb. 1, 2022

(54) METHOD FOR PLAYING PANORAMIC PICTURE AND APPARATUS FOR PLAYING PANORAMIC PICTURE (71) Applicant: SHENZHEN KANDAO TECHNOLOGY CO., LTD., Shenzhen (CN)

(72) Inventors: Dan Chen, Shenzhen (CN); Zhijing Shao, Shenzhen (CN); Dongfeng Xing, Shenzhen (CN)

(73) Assignee: SHENZHEN KANDAO TECHNOLOGY CO., LTD., Shenzhen (CN)

( * ) Notice: Subject to any disclaimer, the term of this patent is extended or adjusted under 35 U.S.C. 154(b) by 264 days.

(21) Appl. No.: 16/478,921

(22) PCT Filed: Mar. 24, 2017

(86) PCT No.: PCT/CN2017/078166
§ 371 (c)(1),
(2) Date: Jul. 18, 2019

(87) PCT Pub. No.: WO2018/170917
PCT Pub. Date: Sep. 27, 2018

(65) Prior Publication Data
US 2019/0387279 A1    Dec. 19, 2019

(51) Int. Cl.
*H04N 7/01*       (2006.01)
*H04N 11/20*      (2006.01)
(Continued)

(52) U.S. Cl.
CPC ......... *H04N 21/4725* (2013.01); *G03B 37/00* (2013.01); *H04N 5/23238* (2013.01); *H04N 21/431* (2013.01)

(58) Field of Classification Search
CPC .......... H04N 21/4725; H04N 5/23238; H04N 21/431; G03B 37/00
See application file for complete search history.

(56) References Cited

U.S. PATENT DOCUMENTS

| | | | |
|---|---|---|---|
| 2015/0085086 A1 | 3/2015 | Marchand et al. | |
| 2018/0227558 A1* | 8/2018 | Oto | G06T 3/0043 |
| 2019/0174116 A1* | 6/2019 | Oh | H04N 19/597 |

FOREIGN PATENT DOCUMENTS

| | | |
|---|---|---|
| CN | 106131540 A | 11/2016 |
| CN | 106384330 A | 2/2017 |

OTHER PUBLICATIONS

English Translation of U.S. Appl. No. 62/342,172 of US Pub. No. 20190174116 A1 to Oh (Year: 2016).*

(Continued)

*Primary Examiner* — Kyu Chae
(74) *Attorney, Agent, or Firm* — Tim Tingkang Xia, Esq.; Locke Lord LLP (57) ABSTRACT

Provided is a method for playing a panoramic picture, the method comprising: acquiring a corresponding non-planar panoramic picture according to a picture acquisition instruction; acquiring picture content from the non-planar panoramic picture, and determining a main presentation axis and a presentation centre of the picture content; creating a cylindrical projection plane by using the main presentation axis and the presentation centre, wherein a cylinder extension direction of the cylindrical projection plane is substantially perpendicular to the main presentation axis, and the centre of the cylindrical projection plane essentially overlaps the presentation centre; converting the non-planar panoramic picture into a cylindrical panoramic picture with the cylindrical projection plane; and executing a playing operation on the cylindrical panoramic picture by using a planar display apparatus.

15 Claims, 7 Drawing Sheets

(51) Int. Cl.
*H04N 21/4725* (2011.01)
*H04N 5/232* (2006.01)
*H04N 21/431* (2011.01)
*G03B 37/00* (2021.01)

(56) References Cited

OTHER PUBLICATIONS

State Intellectual Property Office of People's Republic of China, "International Search Report for PCT Application No. PCT/CN2017/078166", China, dated Dec. 27, 2017.

\* cited by examiner

METHOD FOR PLAYING PANORAMIC PICTURE AND APPARATUS FOR PLAYING PANORAMIC PICTURE

FIELD

The present disclosure relates to the technical field of image processing, and more particularly, to panoramic picture playing methods and a panoramic picture playing device.

BACKGROUND

With the development of Virtual Reality (VR) and Augmented Reality (AR) technologies, a variety of VR applications have been developed, such as 3D panoramic video playback, 3D panoramic game experience and 3D panoramic picture live broadcast.

A panoramic picture played by an existing VR player is generally a non-planar panoramic picture such as a spherical panoramic picture or a fisheye panoramic picture. When these panoramic pictures are played by using VR glasses, since curved lenses are arranged in the VR glasses, problems of picture deformation and the like are avoided when a user watches the above panoramic pictures.

However, in order to share the panoramic pictures sometimes, the user may possibly play the above panoramic pictures in a projection way or play the panoramic pictures by using a flat-panel TV. At this time, since a picture display surface is a plane, and the panoramic pictures are spherical projection planes or fisheye projection planes, when the user uses the above flat-panel video player to play the panoramic pictures, the problem of severe picture stretching is likely to occur at the edge of the pictures.

Therefore, it is necessary to provide a panoramic picture playing method and a panoramic picture playing device, so as to solve the problems existing in the prior art.

SUMMARY

The embodiment of the present disclosure provides panoramic picture playing methods and a panoramic picture playing device which can perform a plane projection operation on a non-planar panoramic picture and avoid severe picture stretching at the edge of the picture, so as to solve the technical problem that severe picture stretching is likely to occur at the edge of the picture during panoramic picture playing with a flat-panel video player of an existing panoramic picture playing method and an existing panoramic picture playing device.

An embodiment of the present disclosure provides a panoramic picture playing method, including:
acquiring a corresponding non-planar panoramic picture according to a picture acquisition instruction, wherein the non-planar panoramic picture is a panoramic picture having a non-planar projection plane;
acquiring a picture content in the non-planar panoramic picture, and determining a main presentation axis and a presentation center of the picture content;
establishing a cylindrical projection plane by using the main presentation axis and the presentation center, wherein a cylindrical extending direction of the cylindrical projection plane is substantially perpendicular to the main presentation axis, and the center of the cylindrical projection plane is basically overlapped with the presentation center; converting the non-planar panoramic picture into a cylindrical panoramic picture having the cylindrical projection plane; playing the cylindrical panoramic picture by using a flat-panel display device;
receiving a picture adjustment instruction, and acquiring a current display region of the cylindrical panoramic picture in the entire panoramic picture according to the picture adjustment instruction;
determining a preset display region of the entire panoramic picture from standby display regions according to the current display region;
determining picture adjustment parameters of the cylindrical panoramic picture according to the current display region of the cylindrical panoramic picture in the entire panoramic picture and the preset display region; and
adjusting the cylindrical panoramic picture to the preset display region based on the picture adjustment parameters, wherein a center line of the preset display region is basically overlapped with a center line of the entire panoramic picture.

A main presentation direction is the same as a horizontal presentation direction of the flat-panel display device.

The non-planar panoramic picture includes, but not limited to, a panoramic picture having a spherical projection plane, a conical projection plane, a cubic projection plane or a fisheye projection plane.

In the panoramic picture playing method of the present disclosure, the area of the preset display region is substantially equal to the display area of the flat-panel display device.

In the panoramic picture playing method of the present disclosure, the entire panoramic picture includes at least one standby display region used to form the preset display region. The area of the standby display region is greater than or equal to the display area of the flat-panel display device.

An embodiment of the present disclosure provides a panoramic picture playing method, including:
acquiring a corresponding non-planar panoramic picture according to a picture acquisition instruction, wherein the non-planar panoramic picture is a panoramic picture having a non-planar projection plane;
acquiring a picture content in the non-planar panoramic picture, and determining a main presentation axis and a presentation center of the picture content;
establishing a cylindrical projection plane by using the main presentation axis and the presentation center, wherein a cylindrical extending direction of the cylindrical projection plane is substantially perpendicular to the main presentation axis, and the center of the cylindrical projection plane is basically overlapped with the presentation center;
converting the non-planar panoramic picture into a cylindrical panoramic picture having the cylindrical projection plane; and
playing the cylindrical panoramic picture by using a flat-panel display device.

In the panoramic picture playing method of the present disclosure, a main presentation direction is the same as a horizontal presentation direction of the flat-panel display device.

In the panoramic picture playing method of the present disclosure, the non-planar panoramic picture includes, but not limited to, a panoramic picture having a spherical projection plane, a conical projection plane, a cubic projection plane or a fisheye projection plane.

In the panoramic picture playing method of the present disclosure, the step of establishing a cylindrical projection plane by using the main presentation direction specifically includes:

determining a cylindrical curvature of the cylindrical projection plane according to the resolution and a viewing angle of the non-planar panoramic picture.

In the panoramic picture playing method of the present disclosure, a cylindrical radius of the cylindrical projection plane is:

$$r=(W/2)/\tan(\text{fov}/2)$$

wherein r is the cylindrical radius of the cylindrical projection plane; W is the resolution of the panoramic picture; fov is the viewing angle of the panoramic picture; or a cylindrical radius of the cylindrical projection plane is:

$$r=W/\text{fov}$$

wherein r is the cylindrical radius of the cylindrical projection plane; W is the resolution of the panoramic picture; and fov is the viewing angle of the panoramic picture.

In the panoramic picture playing method of the present disclosure, the step of converting the non-planar panoramic picture into a cylindrical panoramic picture having the cylindrical projection plane is specifically that:

coordinates of a picture point of the cylindrical panoramic picture are:

$$u=\tan^{-1}(x/z);$$

$$v=y/(\sqrt{x^2+z^2})$$

wherein x, y and z are three-dimensional coordinates of the picture point in the non-planar panoramic picture; u is a horizontal coordinate of the picture point in the cylindrical panoramic picture; and v is a vertical coordinate of the picture point in the cylindrical panoramic picture.

In the panoramic picture playing method of the present disclosure, the panoramic picture playing method further includes:

receiving a picture adjustment instruction, and acquiring a current display region of the cylindrical panoramic picture according to the picture adjustment instruction;

determining picture adjustment parameters of the cylindrical panoramic picture according to the current display region of the cylindrical panoramic picture and a preset display region; and adjusting the cylindrical panoramic picture to the preset display region based on the picture adjustment parameters, wherein a center line of the preset display region is basically overlapped with a center line of the cylindrical panoramic picture corresponding to the picture content in the main presentation direction.

In the panoramic picture playing method of the present disclosure, the area of the preset display region is substantially equal to the display area of the flat-panel display device.

In the panoramic picture playing method of the present disclosure, the cylindrical panoramic picture includes at least one standby display region used to form the preset display region. The area of the standby display region is greater than or equal to the display area of the flat-panel display device.

In the panoramic picture playing method of the present disclosure, the panoramic picture playing method further includes:

determining a preset display region displayed by the flat-panel display device from the standby display regions according to the current display region.

In the panoramic picture playing method of the present disclosure, the step of determining a preset display region displayed by the flat-panel display device from the standby display regions according to the current display region includes:

acquiring a region center of the current display region;

acquiring a center point of the center line of the cylindrical projection plane according to the shortest distance between the region center of the current display region and the center line of the cylindrical projection plane corresponding to the cylindrical panoramic picture; and determining a region center of the preset display region displayed by the flat-panel display device from the standby display regions according to the center point.

In the panoramic picture playing method of the present disclosure, the step of determining a region center of the preset display region displayed by the flat-panel display device from the standby display regions according to the center point includes:

determining a plurality of standby preset display regions according to the standby display regions; and taking the standby preset display region closest to the center point as the preset display region displayed by the flat-panel display device.

In the panoramic picture playing method of the present disclosure, the panoramic picture playing method further includes:

setting a center line mark on the center line of the cylindrical panoramic picture corresponding to the picture content in the main presentation direction.

In the panoramic picture playing method of the present disclosure, the picture adjustment instruction includes at least one of an entity button instruction, a touch instruction, a voice instruction and a vibration instruction.

An embodiment of the present disclosure further provides a panoramic picture playing device, including:

a non-planar panoramic picture acquisition module, configured to acquire a corresponding non-planar panoramic picture according to a picture acquisition instruction, wherein the non-planar panoramic picture is a panoramic picture having a non-planar projection plane;

a main presentation direction acquisition module, configured to acquire a picture content in the non-planar panoramic picture, and determine a main presentation axis and a presentation center of the picture content;

a cylindrical projection plane establishment module, configured to establish a cylindrical projection plane by using the main presentation axis and the presentation center, wherein a cylindrical extending direction of the cylindrical projection plane is substantially perpendicular to the main presentation axis, and the center of the cylindrical projection plane is basically overlapped with the presentation center;

a conversion module, configured to convert the non-planar panoramic picture into a cylindrical panoramic picture having the cylindrical projection plane; and a playing module, configured to play the cylindrical panoramic picture by using a flat-panel display device.

In the panoramic picture playing device of the present disclosure, a main presentation direction is the same as a horizontal presentation direction of the flat-panel display device.

In the panoramic picture playing device of the present disclosure, the non-planar panoramic picture includes, but not limited to, a panoramic picture having a spherical projection plane, a conical projection plane, a cubic projection plane or a fisheye projection plane.

In the panoramic picture playing device of the present disclosure, the cylindrical projection plane establishment module is configured to determine a cylindrical curvature of the cylindrical projection plane according to the resolution and a viewing angle of the non-planar panoramic picture.

Compared with a panoramic picture playing method and a panoramic picture playing device in the prior art, the panoramic picture playing methods and the panoramic picture playing device of the present disclosure have the advantages that after the non-planar panoramic picture is converted into the cylindrical panoramic picture, the cylindrical panoramic picture is played by using the flat-panel display device, so that the problem that severe picture stretching is likely to occur at the edge of a picture is avoided, and the technical problem that severe picture stretching is likely to occur at the edge of the picture during panoramic picture playing with a flat-panel video player of the existing panoramic picture playing method and panoramic picture playing device is solved.

DETAILED DESCRIPTION

Technical solutions in the embodiments of the present disclosure will be clearly and completely described below in combination with accompanying drawings in the embodiments of the present disclosure. Apparently, the embodiments described herein are only one part of embodiments of the present disclosure, but not all the embodiments. Based on the embodiments in the present disclosure, all other embodiments obtained by those skilled in the art without paying creative work fall within the protection scope of the present disclosure.

Panoramic picture playing methods and a panoramic picture playing device of the present disclosure may play a non-planar panoramic picture by using a flat-panel display device, and may improve the picture display quality of the edge of a picture. The panoramic picture playing device herein may be arranged in the flat-panel display device such as a flat-panel TV or a projector, and may well improve the picture display quality of the flat-panel display device.

Figure 1:
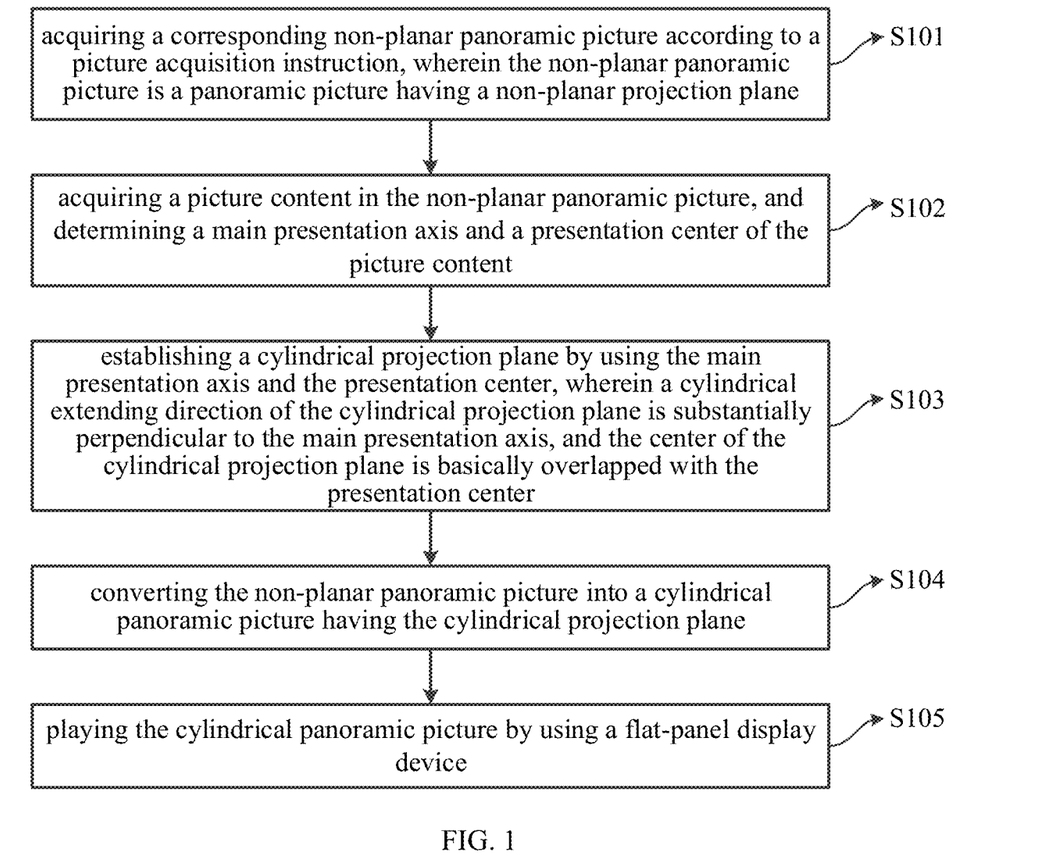
FIG. 1 is a flowchart of a first preferred embodiment of a panoramic picture playing method of the present disclosure.

Referring to FIG. 1, FIG. 1 is a flowchart of a preferred embodiment of a panoramic picture playing method of the present disclosure. The panoramic picture playing method of the present preferred embodiment may be implemented by using the above flat-panel display device. The panoramic picture playing method includes that:

Step S101, a corresponding non-planar panoramic picture is acquired according to a picture acquisition instruction, wherein the non-planar panoramic picture is a panoramic picture having a non-planar projection plane;

Step S102, a picture content in the non-planar panoramic picture is acquired, and a main presentation axis and a presentation center of the picture content are determined;

Step S103, a cylindrical projection plane is established by using the main presentation axis and the presentation center, wherein a cylindrical extending direction of the cylindrical projection plane is substantially perpendicular to the main presentation axis, and the center of the cylindrical projection plane is basically overlapped with the presentation center;

Step S104, the non-planar panoramic picture is converted into a cylindrical panoramic picture having the cylindrical projection plane; and Step S105, the cylindrical panoramic picture is played by using a flat-panel display device.

Specific flows of all the steps of the panoramic picture playing method of the present preferred embodiment are described below in detail.

In Step S101, a panoramic picture playing device receives the picture acquisition instruction. The picture acquisition instruction is an instruction that a user acquires a current panoramic picture, such as an instruction that the user requests to display the current panoramic picture, or an instruction that the user drags the current panoramic picture to acquire a new panoramic picture. The non-planar panoramic picture herein is a panoramic picture having a non-planar projection plane, including, but not limited to, a panoramic picture having a spherical projection plane, a conical projection plane, a cubic projection plane or a fisheye projection plane, etc.; and then the panoramic picture playing device acquires the corresponding non-planar panoramic picture from the entire panoramic picture according to the picture acquisition instruction.

The non-planar panoramic picture should be a part of the entire panoramic picture. A corresponding non-planar panoramic picture should be re-acquired from the entire panoramic picture whenever the panoramic picture playing device receives an instruction for acquiring a new panoramic picture (such as panoramic pictures of other regions in the entire panoramic picture). Then, Step S102 is continued.

In Step S102, the panoramic picture playing device acquires the picture content in the non-planar panoramic picture in Step S101, and determines the main presentation axis and the presentation center of the picture content. The main presentation axis is an axis passing through the presentation center and having a main presentation direction, and the presentation center is a center of the picture content.

The main presentation direction of the main presentation axis of the picture content is a major presentation direction of the picture content, such as from left side of the picture content to the right side, or from the upper side of the picture content to the lower side, etc. The main presentation direction is only related to the picture content presented by the non-planar panoramic picture and is unrelated to a presentation form of the non-planar panoramic picture. Therefore, a way and position for projecting, by the picture content, a picture on a projection plane of any shape are determined through the main presentation axis and the presentation center of the picture content.

Since the existing user generally tends to drag a presented picture in a horizontal presentation direction or a vertical presentation direction of the flat-panel display device, the main presentation axis of the picture content may be set in the horizontal presentation direction or the vertical presentation direction of the flat-panel display device herein. Of course, other presentation directions also may be set as the main presentation direction of the main presentation axis of the picture content according to a requirement of the user herein. Then, Step S103 is continued.

In Step S103, the panoramic picture playing device establishes the cylindrical projection plane by using the main presentation axis and the presentation center which are acquired in Step S102. The cylindrical extending direction of the cylindrical projection plane is substantially perpendicular to the main presentation direction of the main presentation axis, and the center of the cylindrical projection plane is basically overlapped with the presentation center. The cylindrical extending direction of the cylindrical projection plane herein refers to an axial extending direction of a cylinder corresponding to the cylindrical projection plane.

That is, the cylindrical projection plane is established according to the main presentation axis and the presentation center of the picture content. A picture of the cylindrical projection plane in the direction perpendicular to the cylindrical extending direction has no picture deformation, so that the use of the cylindrical projection plane may well reduce or eliminate the problem of severe picture stretching of the picture content at the edge of the main presentation direction.

Specifically, a cylindrical curvature of the cylindrical projection plane may be determined herein according to the resolution and a viewing angle of the non-planar panoramic picture.

In order to guarantee the stability of the resolution in the middle of the picture, a cylindrical radius of the cylindrical projection plane may be set as:

$$r=(W/2)/\tan(\text{fov}/2)$$

wherein r is the cylindrical radius of the cylindrical projection plane; W is the resolution of the panoramic picture; fov is the viewing angle of the panoramic picture. In this way, the resolution of the cylindrical panoramic picture corresponding to the middle part of the cylindrical projection plane may be well guaranteed.

In order to guarantee the stability of the viewing angle of the picture, a cylindrical radius of the cylindrical projection plane may be set as:

$$r=W/\text{fov}$$

wherein r is the cylindrical radius of the cylindrical projection plane; W is the resolution of the panoramic picture; and fov is the viewing angle of the panoramic picture. In this way, the viewing angle of a picture, in the direction perpendicular to the main presentation direction, of the cylindrical panoramic picture corresponding to the cylindrical projection plane may be well guaranteed. Then, Step S104 is continued.

In Step S104, the panoramic picture playing device converts the non-planar panoramic picture acquired in Step S101 into the cylindrical panoramic picture having the cylindrical projection plane according to the cylindrical projection plane acquired in Step S103. After the non-planar panoramic picture is converted into the cylindrical panoramic picture, the main presentation direction of the picture content of the cylindrical panoramic picture should be substantially perpendicular to the cylindrical extending direction of the cylindrical projection plane. In this way, the problem of severe picture stretching at the edge of the non-planar panoramic picture may be effectively reduced or eliminated. The presentation center of the picture content of the cylindrical panoramic picture should be overlapped with the center of the corresponding flat-panel display device as much as possible. In this way, the problem of longitudinal stretching of a middle region of the cylindrical panoramic picture also may be reduced, so that the flat-panel display device may present the cylindrical panoramic picture in the best picture quality. Specifically, coordinates of a picture point of the cylindrical panoramic picture are:

$$u=\tan^{-1}(x/z);$$

$$v=y/(\sqrt{x^2+z^2})$$

wherein x, y and z are three-dimensional coordinates of the picture point in the non-planar panoramic picture; u is a horizontal coordinate of the picture point in the cylindrical panoramic picture, namely an angle of the picture point in the cylindrical panoramic picture; and v is a vertical coordinate of the picture point in the cylindrical panoramic picture, namely a height of the picture point in the cylindrical panoramic picture. Then, Step S105 is continued.

In Step S105, the panoramic picture playing device plays the cylindrical panoramic picture acquired in Step S104 by using the flat-panel display device.

In this way, a panoramic picture playing process of the panoramic picture playing method of the present preferred embodiment is completed.

The panoramic picture playing method of the present preferred embodiment converts the non-planar panoramic picture into the cylindrical panoramic picture and then plays the cylindrical panoramic picture by using the flat-panel display device, thus avoiding the problem that severe picture stretching is likely to occur at the edge of the picture.

Figure 2:
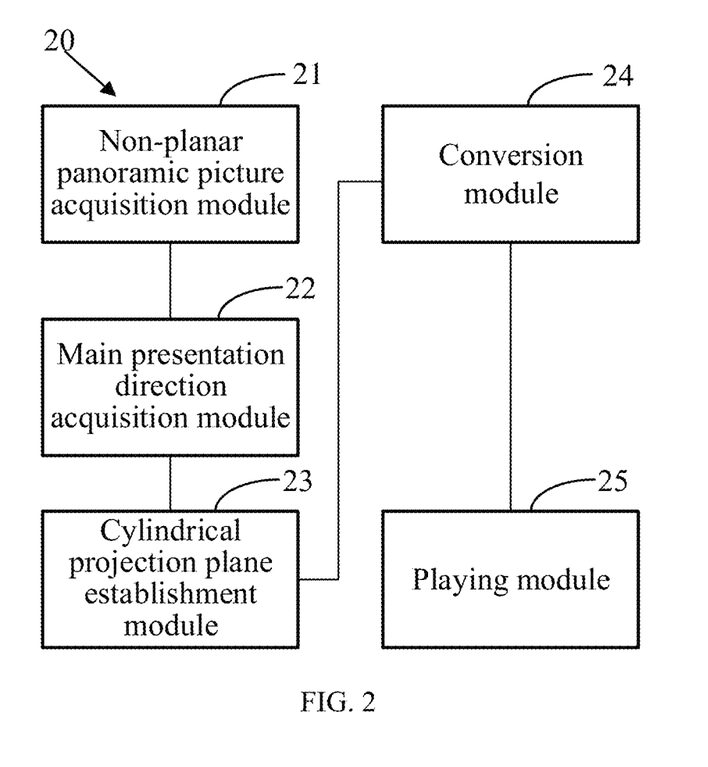
FIG. 2 is a structural schematic diagram of a first preferred embodiment of a panoramic picture playing device of the present disclosure.

Referring to FIG. 2, FIG. 2 is a structural schematic diagram of a preferred embodiment of a panoramic picture playing device of the present disclosure. The panoramic picture playing device of the present preferred embodiment may be implemented by using the first preferred embodiment of the above panoramic picture playing method. The panoramic picture playing device 20 of the present preferred embodiment includes a non-planar panoramic picture acquisition module 21, a main presentation direction acquisition module 22, a cylindrical projection plane establishment module 23, a conversion module 24 and a playing module 25.

The non-planar panoramic picture acquisition module 21 is configured to acquire a corresponding non-planar panoramic picture according to a picture acquisition instruction, wherein the non-planar panoramic picture is a panoramic picture having a non-planar projection plane. The main presentation direction acquisition module 22 is configured to acquire a picture content in the non-planar panoramic picture, and determine a main presentation axis and a presentation center of the picture content. The cylindrical projection plane establishment module 23 is configured to establish a cylindrical projection plane by using the main presentation axis and the presentation center, wherein a cylindrical extending direction of the cylindrical projection plane is substantially perpendicular to the main presentation axis, and the center of the cylindrical projection plane is basically overlapped with the presentation center. The conversion module 24 is configured to convert the non-planar panoramic picture into a cylindrical panoramic picture having the cylindrical projection plane. The playing module 25 is configured to play the cylindrical panoramic picture by using a flat-panel display device.

During use of the panoramic picture playing device 20 of the present preferred embodiment, firstly, the non-planar panoramic picture acquisition module 21 receives the picture acquisition instruction. The picture acquisition instruction is an instruction that a user acquires a current panoramic picture, such as an instruction that the user requests to display the current panoramic picture, or an instruction that the user drags the current panoramic picture to acquire a new panoramic picture. The non-planar panoramic picture herein is a panoramic picture having a non-planar projection plane, including, but not limited to, a panoramic picture having a spherical projection plane, a conical projection plane, a cubic projection plane or a fisheye projection plane, etc.; and then the non-planar panoramic picture acquisition module 21 acquires the corresponding non-planar panoramic picture from the entire panoramic picture according to the picture acquisition instruction.

The non-planar panoramic picture should be a part of the entire panoramic picture. A corresponding non-planar panoramic picture should be re-acquired from the entire panoramic picture whenever the non-planar panoramic picture acquisition module 21 receives an instruction for acquiring a new panoramic picture (such as panoramic pictures of other regions in the entire panoramic picture).

Then, the main presentation direction acquisition module 22 acquires the picture content in the non-planar panoramic picture, and determines the main presentation axis and the presentation center of the picture content. The main presentation axis is an axis passing through the presentation center and having a main presentation direction, and the presentation center is a center of the picture content.

The main presentation direction of the main presentation axis of the picture content is a major presentation direction of the picture content, such as from left side of the picture content to the right side, or from the upper side of the picture content to the lower side, etc. The main presentation direction is only related to the picture content presented by the non-planar panoramic picture and is unrelated to a presentation form of the non-planar panoramic picture. Therefore, a way and position for projecting, by the picture content, a picture on a projection plane of any shape are determined through the main presentation axis and the presentation center of the picture content.

Since the existing user generally tends to drag a presented picture in a horizontal presentation direction or a vertical presentation direction of the flat-panel display device, the main presentation axis of the picture content may be set in the horizontal presentation direction or the vertical presentation direction of the flat-panel display device herein. Of course, other presentation directions also may be set as the main presentation direction of the main presentation axis of the picture content according to a requirement of the user herein.

The cylindrical projection plane establishment module 23 establishes the cylindrical projection plane by using the main presentation axis and the presentation center which are acquired by the main presentation direction acquisition module 22. The cylindrical extending direction of the cylindrical projection plane is substantially perpendicular to the main presentation direction of the main presentation axis, and the center of the cylindrical projection plane is basically overlapped with the presentation center. The cylindrical extending direction of the cylindrical projection plane herein refers to an axial extending direction of a cylinder corresponding to the cylindrical projection plane.

That is, the cylindrical projection plane is established according to the main presentation axis and the presentation center of the picture content. A picture of the cylindrical projection plane in the direction perpendicular to the cylindrical extending direction has no picture deformation, so that the use of the cylindrical projection plane may well reduce or eliminate the problem of severe picture stretching of the picture content at the edge of the main presentation direction.

Specifically, a cylindrical curvature of the cylindrical projection plane may be determined herein according to the resolution and a viewing angle of the non-planar panoramic picture.

In order to guarantee the stability of the resolution in the middle of the picture, a cylindrical radius of the cylindrical projection plane may be set as:

$$r=(W/2)/\tan(fov/2)$$

wherein r is the cylindrical radius of the cylindrical projection plane; W is the resolution of the panoramic picture; fov is the viewing angle of the panoramic picture. In this way, the resolution of the cylindrical panoramic picture corresponding to the middle part of the cylindrical projection plane may be well guaranteed.

In order to guarantee the stability of the viewing angle of the picture, a cylindrical radius of the cylindrical projection plane may be set as:

$$r=W/fov$$

wherein r is the cylindrical radius of the cylindrical projection plane; W is the resolution of the panoramic picture; and fov is the viewing angle of the panoramic picture. In this way, the viewing angle of a picture, in the direction perpendicular to the main presentation direction, of the cylindrical panoramic picture corresponding to the cylindrical projection plane may be well guaranteed. Then, Step S104 is continued.

Then, the conversion module 24 converts the non-planar panoramic picture acquired by the non-planar panoramic picture acquisition module 21 into the cylindrical panoramic picture having the cylindrical projection plane according to the cylindrical projection plane acquired by the cylindrical projection plane establishment module 23. After the non-planar panoramic picture is converted into the cylindrical panoramic picture, the main presentation direction of the picture content of the cylindrical panoramic picture should be substantially perpendicular to the cylindrical extending direction of the cylindrical projection plane. In this way, the problem of severe picture stretching at the edge of the non-planar panoramic picture may be effectively reduced or eliminated. The presentation center of the picture content of the cylindrical panoramic picture should be overlapped with the center of the corresponding flat-panel display device as much as possible. In this way, the problem of longitudinal stretching of a middle region of the cylindrical panoramic picture also may be reduced, so that the flat-panel display device may present the cylindrical panoramic picture in the best picture quality. Specifically, coordinates of a picture point of the cylindrical panoramic picture are:

$$u=\tan^{-1}(x/z);$$

$$v=y/(\sqrt{x^2+z^2})$$

wherein x, y and z are three-dimensional coordinates of the picture point in the non-planar panoramic picture; u is a horizontal coordinate of the picture point in the cylindrical panoramic picture, namely an angle of the picture point in the cylindrical panoramic picture; and v is a vertical coordinate of the picture point in the cylindrical panoramic picture, namely a height of the picture point in the cylindrical panoramic picture.

Finally, the playing module 25 plays the cylindrical panoramic picture acquired by the conversion module 24 by using the flat-panel display device.

In this way, a panoramic picture playing process of the panoramic picture playing device of the present preferred embodiment is completed.

The panoramic picture playing device of the present preferred embodiment converts the non-planar panoramic picture into the cylindrical panoramic picture and then plays the cylindrical panoramic picture by using the flat-panel display device, thus avoiding the problem that severe picture stretching is likely to occur at the edge of the picture.

Specific working principles of the panoramic picture playing methods and the panoramic picture playing device of the present disclosure are described below through a specific embodiment.

Figure 3:
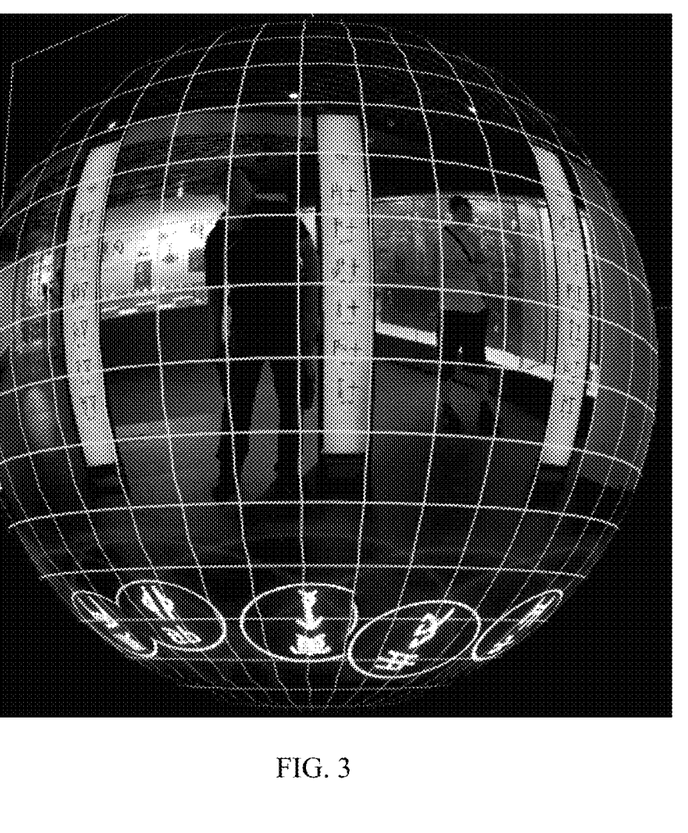
FIG. 3 is a schematic diagram of a panoramic picture having a spherical projection plane in specific embodiments of panoramic picture playing methods and a panoramic picture playing device of the present disclosure.
Figure 4:
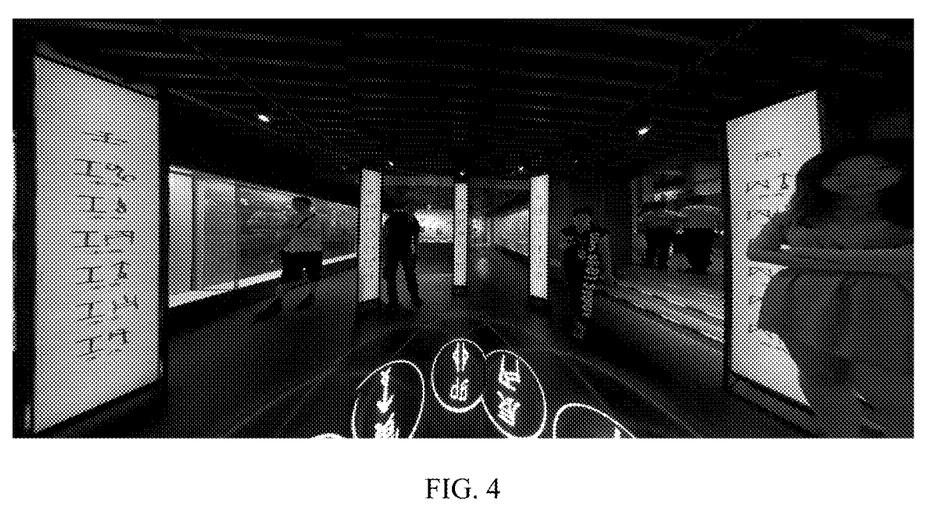
FIG. 4 is a perspective projection schematic diagram of a panoramic picture having a spherical projection plane in specific embodiments of panoramic picture playing methods and a panoramic picture playing device of the present disclosure.

FIG. 3 is a panoramic picture having a spherical projection plane. If the panoramic picture having the spherical projection plane is directly subjected to perspective projection, a projected picture is as shown in FIG. 4. The picture directly subjected to perspective projection has obvious severe picture stretching in the horizontal direction.

Figure 5:
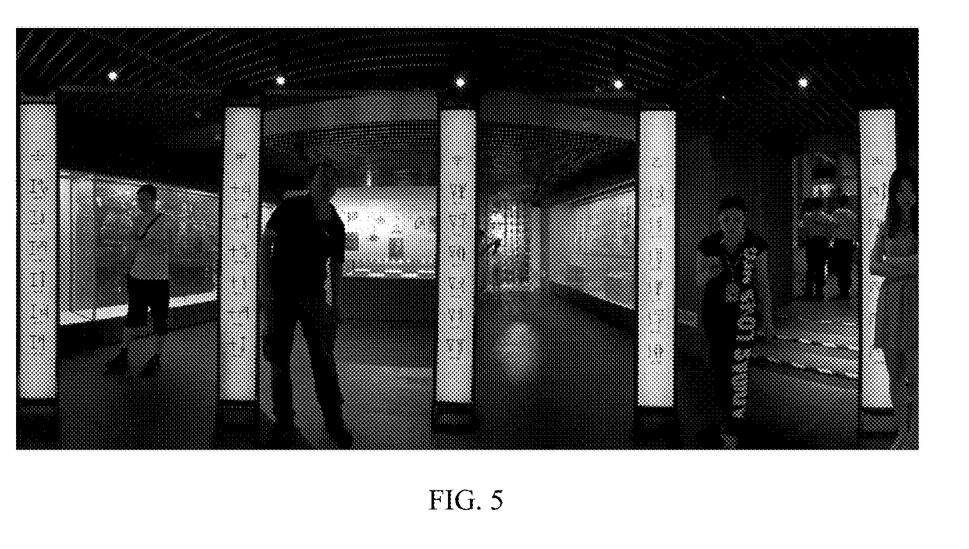
FIG. 5 is a perspective projection schematic diagram of a panoramic picture having a cylindrical projection plane in specific embodiments of panoramic picture playing methods and a panoramic picture playing device of the present disclosure.

In present specific embodiment, a horizontal line of the spherical projection plane is a main presentation direction of a main presentation axis of a corresponding picture content, and the center of the spherical projection plane is a presentation center of the picture content. The panoramic picture playing device establishes a cylindrical projection plane according to the main presentation axis and the presentation center, and projects a panoramic picture having the spherical projection plane according to the cylindrical projection plane, and a projected picture is as shown in FIG. 5. The picture subjected to perspective projection has no picture stretching in the horizontal direction due to the features of the cylindrical projection plane.

In this way, the panoramic picture playing processes of the panoramic picture playing methods and the panoramic picture playing device of the present specific embodiment are completed.

Figure 6:
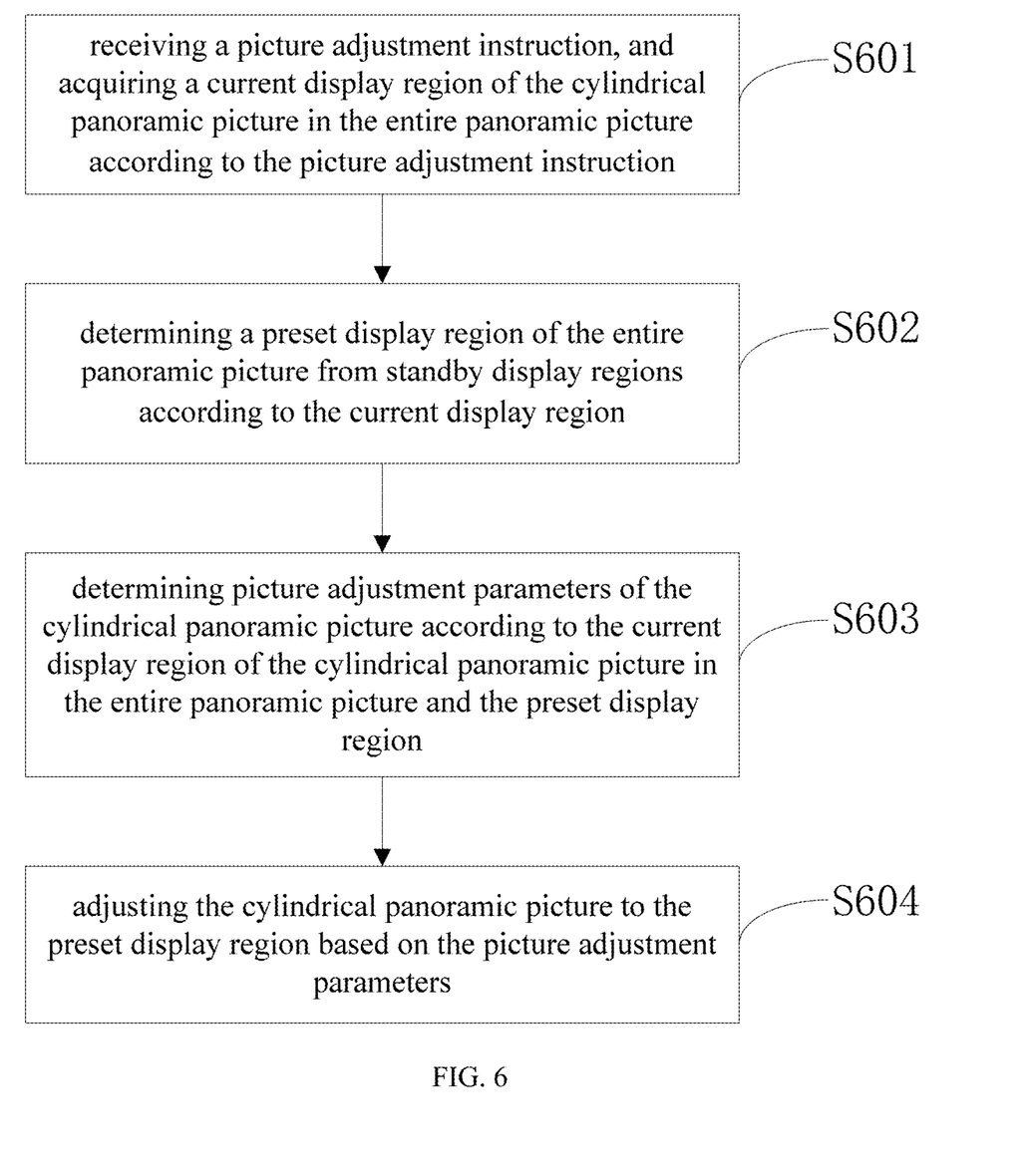
FIG. 6 is a flowchart of a panoramic picture adjustment process of a preferred embodiment of a panoramic picture playing method of the present disclosure.

Referring to FIG. 6, FIG. 6 is a flowchart of a panoramic picture adjustment process of a preferred embodiment of a panoramic picture playing method of the present disclosure. The panoramic picture playing method of the present preferred embodiment may be implemented by using the above flat-panel display device. The panoramic picture playing method includes that:

Step S601, a picture adjustment instruction is received, and a current display region of a cylindrical panoramic picture in an entire panoramic picture is acquired according to the picture adjustment instruction;

Step S602, a preset display region of the entire panoramic picture is determined from standby display regions according to the current display region;

Step S603, picture adjustment parameters of the cylindrical panoramic picture are determined according to the current display region of the cylindrical panoramic picture in the entire panoramic picture and the preset display region; and Step S604, the cylindrical panoramic picture is adjusted to the preset display region based on the picture adjustment parameters.

Specific flows of all the steps of the panoramic picture playing method of the present preferred embodiment are described below in detail.

In Step S601, the panoramic picture playing device receives the picture adjustment instruction, and the picture adjustment instruction is an instruction that a user adjusts the current display region of the flat-panel display device.

The user may send the picture adjustment instruction to set the cylindrical panoramic picture to the preset display region. The user does not know the position of the current display region in the entire panoramic picture due to a picture dragging operation when watching the entire panoramic picture, so that the user cannot fast return to the center region or a major picture display region of the entire panoramic picture. Therefore, in the present preferred embodiment, the panoramic picture playing device may automatically return to the center region or a major picture display region of the entire panoramic picture by setting the picture adjustment instruction, and the use experience of the user is enhanced.

The picture adjustment instruction herein may be an entity button instruction (such as an entity button on the flat-panel display device or an entity button on a remote controller of the flat-panel display device), a touch instruction (such as a double-click instruction, a single-click instruction, a long-press instruction and a dragging instruction on a touch screen of the flat-panel display device), a voice instruction (such as a user voice acquired via a microphone of the flat-panel display device) and a vibration instruction (such as user hand swinging acquired by a vibration sensor of the flat-panel display device).

Then, the panoramic picture playing device acquires the current display region of the cylindrical panoramic picture in the entire panoramic picture according to the acquired picture adjustment instruction. The current display region is the cylindrical panoramic picture region currently being displayed by the flat-panel display device. Then, Step S602 is continued.

In Step S602, the entire panoramic picture includes at least one standby display region used to form the preset display region. The area of the standby display region should be greater than or equal to the area of the display region of the flat-panel display device. The center line region of the entire panoramic picture generally has more watching contents, so that the center line of the preset display region may be configured to be basically overlapped with the center line of the entire panoramic picture herein. The center line herein is parallel to the main presentation axis of the picture content.

Therefore, display regions near to the center line of the entire panoramic picture are all set as the standby display regions, or a plurality of standby display regions are set in the display regions near to the center line of the entire panoramic picture. In this way, the panoramic picture playing device may determine the preset display region which is closest to the current display region and displayed by the flat-panel display device from the standby display regions according to the current display region.

Figure 7:
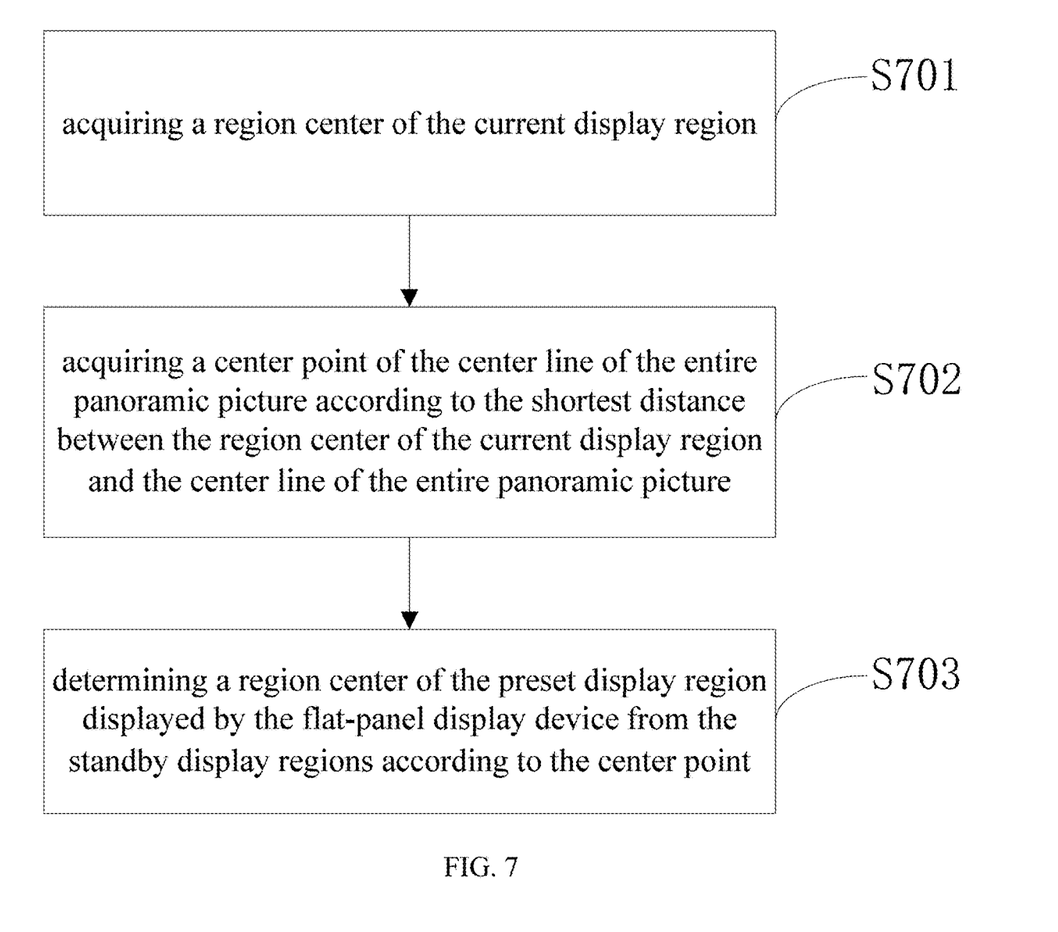
FIG. 7 is a flowchart of Step S602 of a panoramic picture adjustment process of a preferred embodiment of a panoramic picture playing method of the present disclosure.

Specifically, the step S602 includes that:

Step S701, the panoramic picture playing device acquires a region center of the current display region;

Step S702, the panoramic picture playing device acquires the center line of the entire panoramic picture, then calculates the shortest distance between the region center, acquired in Step S701, of the current display region and the center line of the entire panoramic picture, and takes a point, closest to the region center, on the center line as a center point of the center line of the entire panoramic picture; and Step S703, the panoramic picture playing device determines a region center of the preset display region displayed by the flat-panel display device from the standby display regions according to the center point acquired in Step S702.

Specifically, the area of the standby display region should be greater than or equal to the area of the display region of the flat-panel display device, so that the panoramic picture playing device firstly determines a plurality of standby preset display regions according to the standby display regions.

The panoramic picture playing device then takes the standby preset display region closest to the center point as the preset display region displayed by the flat-panel display device, so that the picture adjustment amount in the subsequent operation may be well reduced. Then, Step S603 is continued.

In Step S603, the panoramic picture playing device acquires the current display region, acquired in Step S601, of the cylindrical panoramic picture and the preset display region acquired in Step S602. Then, the panoramic picture playing device determines the picture adjustment parameters, namely moving parameters of a displayed picture on the flat-panel display device moved from the current display region to the preset display region, of the cylindrical panoramic picture according to the current display region and the preset display region. If the preset display region is located on the lower left side of the current display region, the picture adjustment parameters are displayed picture moving parameters of the displayed picture on the flat-panel display device moved from the lower left side of the current display region to the preset display region, and after the displayed picture is moved to the preset display region, the picture content of the preset display region is converted into the cylindrical panoramic picture. Then, Step S604 is continued.

In Step S604, the panoramic picture playing device adjusts the cylindrical panoramic picture to the preset display region based on the picture adjustment parameters acquired in Step S603. That is, the picture content is converted into the cylindrical panoramic picture in the preset display region, thereby allowing the user to fast return to the center region or the major picture display region of the entire panoramic picture, improving the playing quality and playing effect of the panoramic picture, and enhancing the use experience of the user.

In this way, the panoramic picture adjustment process of the panoramic picture playing method of the preset preferred embodiment is completed.

Preferably, in the panoramic picture playing method of the present preferred embodiment, a center line mark also may be set on the center line of the entire panoramic picture. For example, a dotted line which does not affect the watching of the user is used, or mark arrows are set on two sides of the cylindrical panoramic picture.

In this way, the user may know whether the current display region of the cylindrical panoramic picture is deviated from the center line of the entire panoramic picture or not through the center line mark. If the user does not find the center line mark in the current display region of the cylindrical panoramic picture, the picture adjustment instruction may be sent to adjust the current display region of the flat-panel display device to the preset display region. Or, the user may adjust the current display region of the flat-panel display device by himself/herself according to the center line mark.

The panoramic picture adjustment method of the present preferred embodiment may quickly adjust the display region of the flat-panel display device to the preset display region by setting the preset display region having the major picture display region through the picture adjustment instruction, so that quick limitation and adjustment of a picture playing region of the flat-panel display device is realized.

Meanwhile, in the panoramic picture playing method of the present preferred embodiment, the standby display region having a plurality of preset display regions is also set, so that the picture adjustment parameters of the cylindrical panoramic picture may be well reduced, the relevance between the current display region and the preset display region is enhanced, and the quick limitation and adjustment of the picture playing region of the flat-panel display device is further realized.

According to the panoramic picture playing methods and the panoramic picture playing device of the present disclosure, after the non-planar panoramic picture is converted into the cylindrical panoramic picture, the cylindrical panoramic picture is played by using the flat-panel display device, so that the problem that severe picture stretching is likely to occur at the edge of a picture is avoided, and the technical problem that severe picture stretching is likely to occur at the edge of the picture during panoramic picture playing with a flat-panel video player of the existing panoramic picture playing method and panoramic picture playing device is solved.

The terms "component", "module", "system", "interface", "process" and the like, as used herein, are generally intended to refer to a computer-related entity: hardware, a combination of hardware and software, software, or software in execution. For example, a component can be, but not limited to, a process running on a processor, a processor, an object, an executable application, a thread of execution, a program and/or a computer. By way of illustration, both an application running on a controller and the controller can be components. One or more components can reside within a process and/or thread of execution, and a component can be located on a computer and/or distributed between two or more computers.

Various operations of the embodiments are provided herein. In one embodiment, the one or more operations may constitute computer readable instructions stored on one or more computer readable media that, when executed by electronic equipment, cause computing equipment to perform the operations. The order in which some or all of the operations are described should not be construed as implying that these operations must be sequential. Those skilled in the art will understand alternative orders having the benefits of this description. Moreover, it should be understood that not all operations must be present in every embodiment provided herein.

Moreover, the word "preferred" as used herein is intended to serve as an example, instance, or illustration. Any aspect or design described as "preferred" by the text is not necessarily construed as being more advantageous than other aspects or designs. Instead, the use of the word "preferred" is intended to provide a concept in a specific manner. The term "or" as used in this application is intended to refer to an included "or" instead of an excluded "or". That is, unless otherwise specified or clear from the context, "X uses A or B" means naturally including any one of the permutations. That is, if X uses A, X uses B, or X uses both A and B, "X uses A or B" is satisfied in any of the foregoing examples.

Furthermore, the present disclosure has been shown and described with respect to one or more implementations, but those skilled in the art will think of equivalent variations and modifications based on readings and understandings of this description and drawings. The present disclosure includes all such modifications and variations, and is only limited by the scope of the appended claims. With particular regard to various functions executed by the abovementioned components (e.g., elements and resources), the terms used to describe such components are intended to correspond to any component (unless otherwise indicated) that performs the specified functions of the components (e.g., they are functionally equivalent), even the component is not equivalent in structure to the disclosed structure for executing the functions in the exemplary implementations of the present disclosure described herein. Moreover, although particular features of the present disclosure have been disclosed with respect to only one of a plurality of implementations, such features may be combined with one or more other features of other implementations which may be desired and advantageous for a given or particular application. Furthermore, for the terms "including", "having" and "containing" or variations thereof used in the specific implementations or claims, such terms are intended to realize including in a manner similar to the term "comprising".

Each functional unit in the embodiment of the present disclosure may be integrated into one processing module, or each unit may exist physically alone, or two or more units may be integrated into one module. The above integrated modules can be implemented in the form of hardware or in the form of software functional modules. The integrated modules, if implemented in the form of software functional modules and sold or used as stand-alone products, may also be stored in a computer readable storage medium. The abovementioned storage medium may be a read only memory, a magnetic disk or an optical disk, etc. Each of the above devices or systems can execute the methods of the corresponding method embodiments.

Based on the above, the present disclosure has been disclosed in the above preferred embodiments, but the above preferred embodiments are not intended to limit the present disclosure, and those skilled in the art can make various modifications and embellishments without departing from the spirit and scope of the present disclosure. Therefore, the protection scope of the present disclosure is defined by the claims.

What is claimed is:

1. A panoramic picture playing method, comprising:
acquiring a corresponding non-planar panoramic picture according to a picture acquisition instruction, wherein the non-planar panoramic picture is a panoramic picture having a non-planar projection plane;
acquiring a picture content in the non-planar panoramic picture, and determining a main presentation axis and a presentation center of the picture content;
establishing a cylindrical projection plane by using the main presentation axis and the presentation center, wherein a cylindrical extending direction of the cylindrical projection plane is perpendicular to the main presentation axis, and the center of the cylindrical projection plane is overlapped with the presentation center; converting the non-planar panoramic picture into a cylindrical panoramic picture having the cylindrical projection plane;
playing the cylindrical panoramic picture by using a flat-panel display device;
receiving a picture adjustment instruction, and acquiring a current display region of the cylindrical panoramic picture in the entire panoramic picture according to the picture adjustment instruction;
determining a preset display region of the entire panoramic picture from standby display regions according to the current display region;
determining picture adjustment parameters of the cylindrical panoramic picture according to the current display region of the cylindrical panoramic picture in the entire panoramic picture and the preset display region; and
adjusting the cylindrical panoramic picture to the preset display region based on the picture adjustment parameters, wherein a center line of the preset display region is overlapped with a center line of the entire panoramic picture,
wherein a main presentation direction is the same as a horizontal presentation direction of the flat-panel display device;
the non-planar panoramic picture comprises a panoramic picture having a spherical projection plane, a conical projection plane, a cubic projection plane or a fisheye projection plane.

2. The panoramic picture playing method according to claim 1, wherein the area of the preset display region is equal to the display area of the flat-panel display device.

3. The panoramic picture playing method according to claim 1, wherein the entire panoramic picture comprises at least one standby display region used to form the preset display region; the area of the standby display region is greater than or equal to the display area of the flat-panel display device.

4. A panoramic picture playing method, comprising:
acquiring a corresponding non-planar panoramic picture according to a picture acquisition instruction, wherein the non-planar panoramic picture is a panoramic picture having a non-planar projection plane;
acquiring a picture content in the non-planar panoramic picture, and determining a main presentation axis and a presentation center of the picture content;
establishing a cylindrical projection plane by using the main presentation axis and the presentation center, wherein a cylindrical extending direction of the cylindrical projection plane is perpendicular to the main presentation axis, and the center of the cylindrical projection plane is overlapped with the presentation center; converting the non-planar panoramic picture into a cylindrical panoramic picture having the cylindrical projection plane; and
playing the cylindrical panoramic picture by using a flat-panel display device,
wherein the step of establishing the cylindrical projection plane by using the main presentation direction specifically comprises:
determining a cylindrical curvature of the cylindrical projection plane according to the resolution and a viewing angle of the non-planar panoramic picture.

5. The panoramic picture playing method according to claim 4, wherein a main presentation direction is the same as a horizontal presentation direction of the flat-panel display device.

6. The panoramic picture playing method according to claim 4, wherein the non-planar panoramic picture comprises a panoramic picture having a spherical projection plane, a conical projection plane, a cubic projection plane or a fisheye projection plane.

7. The panoramic picture playing method according to claim 4, wherein a cylindrical radius of the cylindrical projection plane is:

$$r=(W/2)/\tan(\text{fov}/2)$$

wherein r is the cylindrical radius of the cylindrical projection plane; W is the resolution of the panoramic picture; fov is the viewing angle of the panoramic picture; or a cylindrical radius of the cylindrical projection plane is:

$$r=W/\text{fov}$$

wherein r is the cylindrical radius of the cylindrical projection plane; W is the resolution of the panoramic picture; and fov is the viewing angle of the panoramic picture.

8. The panoramic picture playing method according to claim 4, wherein the step of converting the non-planar panoramic picture into a cylindrical panoramic picture having the cylindrical projection plane is specifically that:

coordinates of a picture point of the cylindrical panoramic picture are:

$$u=\tan^{-1}(x/z);$$

$$v=y/(\sqrt{x^2+z^2})$$

wherein x, y and z are three-dimensional coordinates of the picture point in the non-planar panoramic picture; u is a horizontal coordinate of the picture point in the cylindrical panoramic picture; and v is a vertical coordinate of the picture point in the cylindrical panoramic picture.

9. The panoramic picture playing method according to claim 4, wherein the panoramic picture playing method further comprises:

receiving a picture adjustment instruction, and acquiring a current display region of the cylindrical panoramic picture in the entire panoramic picture according to the picture adjustment instruction;

determining a preset display region of the entire panoramic picture from standby display regions according to the current display region;

determining picture adjustment parameters of the cylindrical panoramic picture according to the current display region of the cylindrical panoramic picture in the entire panoramic picture and the preset display region; and adjusting the cylindrical panoramic picture to the preset display region based on the picture adjustment parameters, wherein a center line of the preset display region is overlapped with a center line of the entire panoramic picture.

10. The panoramic picture playing method according to claim 9, wherein the area of the preset display region is equal to the display area of the flat-panel display device.

11. The panoramic picture playing method according to claim 9, wherein the entire panoramic picture comprises at least one standby display region used to form the preset display region; and the area of the standby display region is greater than or equal to the display area of the flat-panel display device.

12. The panoramic picture playing method according to claim 11, wherein the panoramic picture playing method further comprises:

determining a preset display region displayed by the flat-panel display device from the standby display regions according to the current display region.

13. The panoramic picture playing method according to claim 12, wherein the step of determining a preset display region displayed by the flat-panel display device from the standby display regions according to the current display region comprises:

acquiring a region center of the current display region;

acquiring a center point of the center line of the entire panoramic picture according to the shortest distance between the region center of the current display region and the center line of the entire panoramic picture; and determining a region center of the preset display region displayed by the flat-panel display device from the standby display regions according to the center point.

14. The panoramic picture playing method according to claim 13, wherein the step of determining a region center of the preset display region displayed by the flat-panel display device from the standby display regions according to the center point comprises:

determining a plurality of standby preset display regions according to the standby display regions; and taking the standby preset display region closest to the center point as the preset display region displayed by the flat-panel display device.

15. The panoramic picture playing method according to claim 9, wherein the picture adjustment instruction comprises at least one of an entity button instruction, a touch instruction, a voice instruction and a vibration instruction.

* * * * *